Patented Nov. 2, 1948

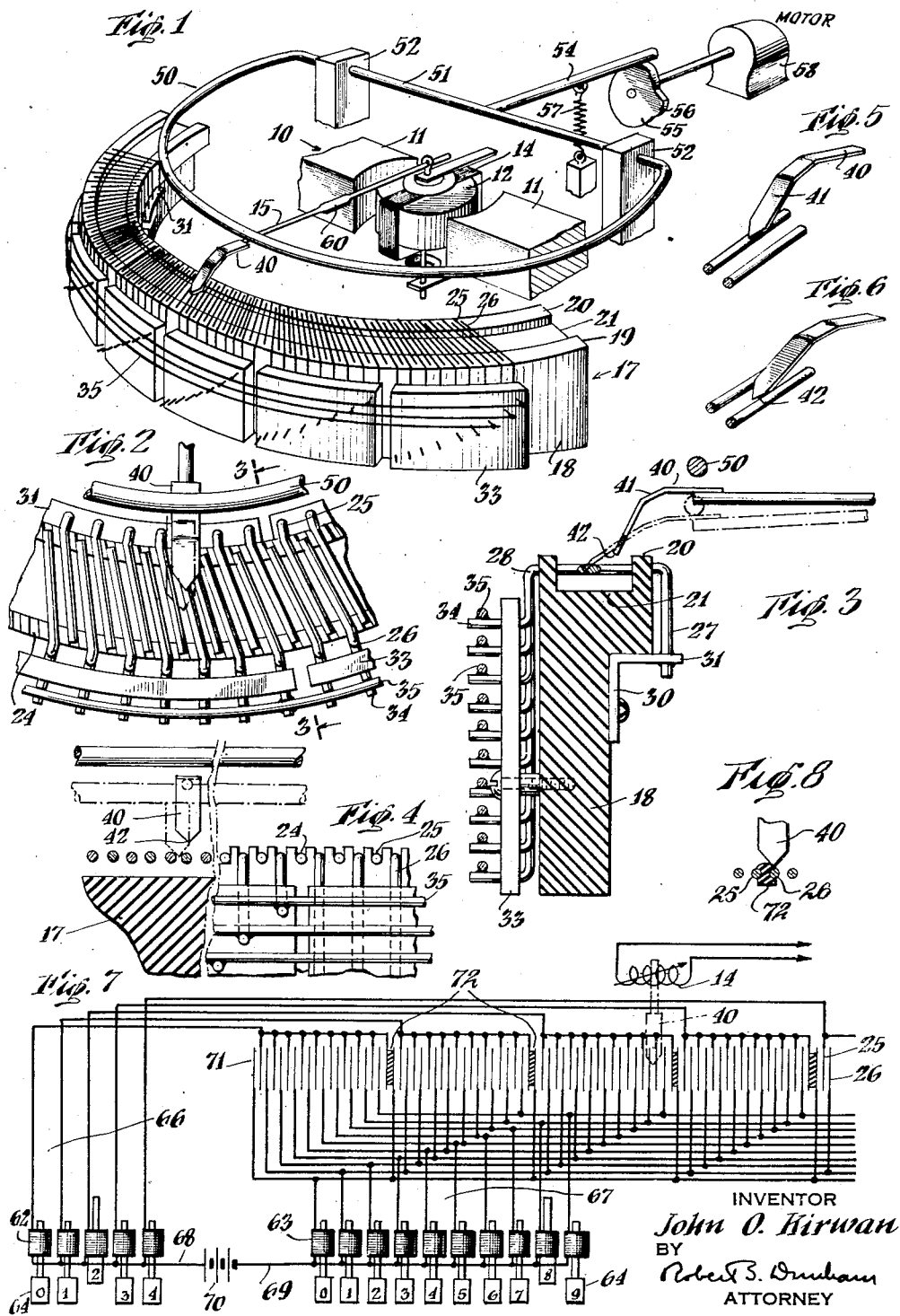

2,452,764

UNITED STATES PATENT OFFICE 2,452,764

SELECTABLE CONTACT TRANSMITTER MEANS FOR SENSITIVE INSTRUMENTS

John O. Kirwan, Bloomfield, N. J., assignor to Wallace & Tiernan Products, Inc., Belleville, N. J., a corporation of New Jersey Application February 19, 1947, Serial No. 729,564

9 Claims. (Cl. 200—56)

This invention relates to contacting means adapted for electrical transmission of the position of an instrument or the like, and in an important specific aspect, relates to depressor-actuated, selectable-contact transmitters for delicately responsive instruments such as provide a high sensitivity and such as are actuated by small amounts of energy insufficient to provide substantial force in the translating operation.

By way of example, one prior device for accomplishing such purpose has involved a sensitive instrument of the galvanometer type having a pointer or needle in the form of a thin rod adapted to sweep across a scale in the form of an arc of a circle. Around the periphery of the scale the device includes a row of mutually insulated teeth, fashioned of sheet metal and arranged as if cut from a sheet lying in a cylinder about the axis of movement of the instrument. Each strip-like tooth has the upper part of its side edges tapered to a point at the top, and a periodically operated depressor bar for the meter needle is provided, so that at regular intervals the bar forces the needle against the serrated structure constituted by the row of teeth, i. e. moving the latter down to a position crossing the edge of a tooth. The controlled electrical circuits are such that the needle is intended to come to rest in the V-shaped depression formed by the slanting edges of two adjacent teeth, and thus to make electrical contact with both of the latter. Under such control the electrical transmitting circuits are appropriate to provide an indication, for instance at some remote station, of the instantaneous position of the galvanometer needle.

A particular difficulty experienced with these devices is that the needle often fails to move into the valley, so to speak, between adjacent contact points. Even though the latter may not have worn dull, it has been found that if the depressor bar happens to move the instrument needle directly against the point of a tooth, the final force of the stroke merely causes the needle to "hang," in effect, on the contact point without moving down on one side or the other so as to make contact with an adjacent element too. In passing, it may be noted that ordinarily devices of this sort are designed to transmit only a reasonable approximation of the position of the movable member, so that if the latter happens to stop just above the point of a contact element, it is relatively immaterial on which side of the element it falls, or should fall, when struck by the depressor bar. On either side the transmitted reading is sufficiently close to the actual one for the desired purpose of remote indication, control or the like, but it is essential to have the needle move down on one side or the other and make the described double contact.

Instead of a galvanometer the instrument actuating the movable member can be any of a variety of other instruments, such as a barometer, altimeter or the like; transmitters of this general type are of particular utility where the pointer is very free-moving and could not, of itself, exert sufficient force to operate contacts or even sweep across a row of contact elements.

An important object of the present invention is to provide improved and more reliable transmitting means and systems of the character described, a particular object being the provision of a novel switching arrangement of the depressor actuated type wherein assurance is afforded that the selecting member will be moved into the desired condition of contact in a place corresponding with reasonable accuracy to the position selected for such member by its controlling meter or other instrumentality. Further objects are to provide rugged, relatively simple and yet adequately sensitive switching means of the character stated, embodying one or more novel structural features or combinations.

To these and such other ends as may be hereinafter apparent or incidental to the use of the apparatus disclosed, a presently desirable form of the invention is shown in the drawings and hereinbelow described, by way of example to illustrate the novel principles and features of structure that are involved.

Referring to the drawings:

Figure 1 is a perspective view, fragmentary in parts and somewhat diagrammatic, of a sensitive instrument embodying transmitter means of the present invention.

Fig. 2 is an enlarged fragmentary plan view of switching instrumentalities shown in Fig. 1.

Fig. 3 is in effect a section on line 3—3 of Fig. 2, except that for clarity of illustration the contact structure is shown as if arranged along a linear rather than a curved path.

Fig. 4 is an elevation, as from the left hand side of Fig. 3, but with a portion shown as if in central section on a plane parallel to the plane of elevation.

Figs. 5 and 6 are enlarged perspective views of the contact-making elements in respectively different positions; and Fig. 7 is a wiring diagram constituting an example of one arrangement of connections that can be embodied in the transmitter system.

Fig. 8 is a fragmentary view similar to Fig. 4 showing certain insulation used with the circuit of Fig. 7.

Referring to Figs. 1 to 4, inclusive, the improvements are shown as if incorporated with a sensitive instrument 10 of the galvanometer type having core structure 11, 12 and a movable coil 14 mounted to swing a member 15 about a vertical axis in accordance with the energization of the coil by appropriate means not shown. It will be understood that an instrument of this type may be employed for a wide variety of purposes, for instance in automatic weather stations where photoelectric or other meteorologically sensitive devices may be employed to energize the coil 14 in accordance with observed conditions. In such circumstances it is desirable to provide a continuous indication or record at some remote locality of the readings of the instrument, and the transmitter structure now to be described may be employed for such purpose. As stated above, any of a variety of other instruments may be substituted for the galvanometer 10, and likewise use of such instruments and of the controlled transmitting system may be made in a wide variety of circumstances other than for weather indicating purposes, i. e. in any situation where remote readings are to be had of a sensitive device.

Along the curved path followed by the member 15 there is disposed a contact structure comprising a supporting base 17, conveniently made of insulating material such as hard rubber, Bakelite, polyvinyl chloride or other plastic. The base 17 has an upstanding wall portion 18 and an upper surface comprising annular projections 19, 20 which extend vertically and bound a relatively wide annular depression 21, the portions 19, 20 and 21 following the curve of the member 17 throughout its length. Each of the upstanding flanges 19, 20 is provided with a multiplicity of transverse grooves 24, to seat the ends of a multiplicity of contact bars that extend across the recessed portion 21. In the example shown, the contact bars are formed of wire of appropriate conducting metal and constitute elements 25, 26 alternately extending over the inner and outer faces of the supporting member 17. That is to say, every other contact bar is designated 25 and constitutes a portion of wire that has its outer end seated in a groove in the rib 19, thence traversing the space 21 and a corresponding groove in the rib 20, and having a further portion 27 which is bent down over the inside face of the member 17. Alternating with the bars 25 are the bars 26, each comprising a length of wire having its outer end seated in the inner rib 20, crossing the space 21 and traversing a groove in the outer rib 19, with a portion 28 bent over to extend down along the outer surface of the member 17.

Thus the successive wire portions 25, 26 spaced throughout the curved length of the base 17, provide an array or series of contact bars extending transversely of the path of the movable member 15. In alternation, the wires extend down one side or the other of the base so that appropriate electrical connection may be made as described below.

Although other connecting means may be used, one structure suitable for a transmitting system involves connecting the contact wires on one side of the member 17 in successive groups, say of ten each, and connecting the wires on the other side of the member in a distributed multiple arrangement so that, say, every tenth wire can be connected to a given one (in order) of a series of ten circuits, the successive circuit connections of the last mentioned wires being duplicated for each set of ten wires corresponding to one of the first mentioned groups. Thus by way of example, the inner face of the supporting wall 18 carries a series of connector elements 30 arranged in spaced end to end relation and having projecting shelf portions 31 with appropriate holes in which the downwardly turned wire portions 27 may be inserted and soldered for electrical contact as shown. Secured in spaced relation to the outer face of the wall 18, a plurality of insulating panels 33 are provided, having a conforming curvature as shown in Figs. 1 and 2 and arranged in end to end relation around the device. Each of the wires 28 extends down along the outer face of the wall 18 and through a corresponding aperture in the adjacent member 33, so as to provide an outwardly projecting stud 34. Assuming, for instance, that the outside connections are to be made in multiples of every tenth wire, the lengths of the wire portions 28 and the localities of the apertures in the panel 33 may be so related that the studs 34 occupy a series of positions that are spaced in succession, both vertically and horizontally. Thus in the device shown the projecting studs are arranged in a row extending diagonally of the panel face, so that connecting bus wires 35 can be disposed circumferentially around the apparatus, each of them being connected to a corresponding stud of every panel.

It will now be seen that if the inner group connectors 31 represent successive increments of 10 units each along a decimal scale for the pointer 15, the outwardly connected wires can represent unit values in each of the inner groups, and the several circumferential connectors 35 may therefore be taken to represent such unit values or successive increments of one (in order from zero to 9), for each of the inner or "tens" groups.

In accordance with a greatly preferred feature of the present invention, the contact bars 25, 26, instead of traversing the space 21 in a perpendicular direction, i. e., in a direction extending radially of the circular arc through which the member 15 swings, are arranged at an acute angle to the corresponding radii. Thus, as clearly apparent in Figs. 1 and 2, the wires are approximately parallel (actually here, at a small angle) to each other, but are all disposed at a predetermined acute angle to the circular path or, by the same token, at a predetermined acute angle to the radius of such path.

For contact at desired times with the bars 25, 26, the outer end of the member 15 carries a strip portion 40 of thin, flexible, resilient metal such as Phosphor bronze or beryllium copper, having a portion 41 turned downwardly at an angle, preferably an acute angle, to the plane of the bars 25, 26 and terminating in a contact portion comprising a V-shaped edge 42 as shown. Thus by reason of the flexible resilience of the member 40, the contact portion 42 is mounted for at least limited movement in a direction across the path of the member 15. Normally the latter is disposed so that the contact part is clear of the wires 25, 26, as will be seen most clearly in the solid line position of Figs. 3, 4 and 5. Although various means may be provided, including in some instances manually operated means, for periodically engaging the contact portion with the array of contact bars, an automatic depressor bar is usually preferable and one form of such construction is shown in the drawings by way of example. The depressor comprises a curved bar 50 having a contour conforming with the arc through which the member 15 travels, the bar 50 having a supporting portion 51 in the form of a transverse shaft carried by suitable bearings 52.

Various means may be employed for periodically rocking the bar about the axis of the shaft 51. For example the latter may carry a projecting arm 54 resting, as a follower, on the surface of a cam 55 having an appropriate high spot 56. The follower 54 is urged against the surface of the cam by the tension of a spring 57, and the shape and size of the cam are such that the spring thus normally holds the bar 50 in a position vertically clear of the upper surface of the member 15. The cam 55 may be rotated by suitable means, such as a motor 58, so that the cam rise 56 periodically rocks the arm 54 and consequently rocks the curved depressor bar 50 downwardly about its supporting bearings 52. When so moved, the bar engages the upper surface of the member 15, conveniently on the portion 40, and pushes the contact edge portion 42 down against the array of contact bars. It will be understood that the member 15 includes suitable resilient flexibility, for example at a portion 60 thereof or elsewhere within its length or at its mounting so that it can be moved down easily by the depressor bar. Until the edge part 42 strikes the contact bars, the downward motion (in its first part) can thus be effected without bending the strip arrangement 40—42. The final part of the downward stroke of the depressor bar flexes the strip 40—41 and causes the contact edge 42 to slide into the desired position between two contact wires, in a manner more fully explained hereinbelow.

As stated, the device shown is intended to provide simultaneous contact of the portion 42 with a pair of adjacent contact bars corresponding as closely as possible to the position given the member 15 by its actuating means 10. It will now be appreciated that any of a wide variety of transmitting circuits and remote indicating, recording or control means may be operated by the described switching device, such circuits including, if desired, electrical connection to and through the element 40, for example by means of the depressor bar 50 which necessarily makes contact with the element throughout each interval in which the bar forces the edge portion 42 into engagement with the contact wires. Merely to illustrate one even simpler scheme of connection, Fig. 7 shows a transmitter system including a rudimentary type of indicating means for representing the position of the member 15 by appropriate numbered elements. Thus for instance there may be a plurality of tens order solenoids or electromagnets 62 and units order electromagnets 63, each of the magnets having an armature 64 that carries an appropriate numeral and is adapted to be elevated to a viewing or other significant position upon energization of the magnet.

Each of the inner contact connectors 31 is connected to one terminal of a corresponding one of the several magnets 62 by one of the conductors 66. There are ten magnets 63 for unit values from zero to 9 inclusive, and by the conductors 67 one terminal of each magnet 63 is connected to a corresponding one of the bus bars 35 which represent unit-position sets of the contact wires 26.

The other terminals of the magnets 62 are all connected together to a common conductor 68, and likewise the other terminals of the magnets 63 to a common conductor 69, and the circuit is completed with a source of current such as the battery 70 connected between the two conductors last mentioned. Simultaneous energization can thus be had of any selected one of the magnets 62 and any selected one of the magnets 63, in series across current source 70, upon making connection between the appropriately corresponding contact bars 25 and 26. Alternatively if desired, parallel energization circuits can be provided for the magnets or like devices by using a common return path (not shown) for the wires 68, 69 through a battery to the element 40.

It will now be seen that when the contact portion 42 engages any two adjacent bars 25, 26 a circuit is completed through one each of the magnets 62 and 63, energizing both and attracting their respective armatures. Since no other magnet can be energized, the combination of indicia displayed by the two attracted armatures registers the position of the pointer 15, by a two-place number. The contact groups 31 represent successive increments of ten units each from the end of the scale (here shown at 71 although other terminal points can be used) and the bars 26 represent increments of one unit in each and any of the tens groups so that the remotely displayed number has appropriate figures in the tens position (magnets 62) and the units position (magnets 63). Thus if the contact element 40—42 stops and is depressed between two bars 25, 26 at the scale point shown for example in Fig. 7, the attracted armatures correctly state its position as 28 units from the end of the scale. Of course, further tens groups (up to 9 or even more) can be provided beyond the few shown in Fig. 7, and alternatively the contact bars can be connected in other groupings and arrangements, e. g. to read values of angles, time or the like measured in non-decimal notation.

With the specific circuit of Fig. 7 a false reading will occur if the contact element 40—42 happens to be depressed between the last right-hand bar 25 of any group 31 of such bars and the immediately adjacent bar 26 that corresponds to the figure zero (0). To avoid such result, the small space between these specific bars, i. e. at the extreme right end of each group 31 (Fig. 2) may be filled with insulating material 72 built up to a slightly convexity between the bars as shown in Fig. 8 so that if the point 42 of the member 40 should initially strike such material, it will slide off (in the same manner as hereinbelow explained) to make contact with the pair of bars on one side or the other.

Referring again to Figs. 2 to 6, inclusive, the operation of the instrument should now be relatively clear from what has already been said. The movement 10 positions the member 15 according to the desired controlling condition, and each time the depressor bar 50 is actuated the contact portion 42 is brought into engagement with a pair of contact bars to complete the desired electrical transmitting circuits. In particular, the arrangement is adapted to provide a positive and entirely reliable contact operation whenever the depressor bar is actuated, insuring that the contact portion actually engages two adjacent bars and does not stick or "hang" on a single bar.

It will be noted that upon depressor actuation the contact portion 42 not only moves downward but in the later stages of the depressor bar movement, slides upon and in the plane of the contact bars, by reason of its resiliently flexible construction. In the device shown, it is thus displaced outwardly of the path of the member 15, and by virtue of the lateral freedom of movement of the member, either because the meter mechanism 10 permits at least a small angular displacement about the axis of swing, or because the member 15 may itself be sufficiently resilient to allow a slight lateral deflection, the contact portion then very readily tends to slide from the top of a bar 25 or 26 into the groove between such bar and one next to it. Whereas a mere downward movement of the contact portion might simply jam its end, however pointed or otherwise convex, against the very top of a contact wire, the transverse displacement of the contact element tends to disturb the relatively unstable equilibrium of such a condition and to cause the end of the element to fall or slide down a side of the wire into the desired double contact position.

A further and especially preferred feature of the invention, cooperating to insure the described operation, is the angular relation of the contact bars to the path of travel of the member 15. As explained above the bars are all disposed at the same, selected acute angle to the radii of the path. The angle may be one of various values, depending on circumstances and on convenience of mounting of the bars; for instance 15 to 20 degrees has been found satisfactory for the device shown. This disposition of the contact wires materially promotes the desired movement of the contact portion 42 into the desired position intermediate a pair of such members; as clearly shown in Figs. 2-4, the displacement afforded by the downward bending or flattening of the member 40 into the dot-and-dash line position is ordinarily radial and thus automatically tends to have a component at an angle to the axes of the angularly disposed contact bars. The effect of this component of motion is to slide the point of the outwardly moving contact portion off the top of a bar upon which it may have been initially poised, so that in the final stage of the downward and outward push exerted by the depressor bar and with the aid of slight lateral movement of the member 15 if necessary, the V-shaped contact edge drops into proper position between two wires 25, 26 and in firm contact with both under the pressure of the bar 50.

In consequence of the described relationships, each operation of the depressor necessarily forces the end of the element 40 into double-contact position between a pair of the contact bars, even though the element may initially hit the top of a bar. In many cases the motion will be as shown in Fig. 2, taking advantage of the angular bar position, but sometimes when the point of the element 40 strikes on or near the top of a bar, conditions are such as to cause it to slide in the other direction and thus come to rest in abutment with the next bar on the other side. As explained, either position represents a reasonably accurate reading of the instrument, for actuation of appropriate indicating or control means.

It is to be understood that the invention is not limited to the specific structures herein shown or described but may be embodied in other forms without departure from its spirit.

I claim:

1. Electrical transmitter means comprising, in combination, a member adapted to be positioned at any place along a predetermined path, an array of regularly spaced contact bars along the path, said bars extending transversely of the path all at substantially the same acute angle thereto, said member being shaped at its end to fit between and against any pair of said bars, and said member being biased to remain clear of said bars, and depressor means for moving the member against the array of bars, to seat the end of the member between and in electrical contact with the pair of bars corresponding to the position of the member in the path, said member including resilient structure supporting its aforesaid end, to permit the latter to move transversely of the path to insure its being seated between bars, when the said end is urged against the bars by the depressor means.

2. Electrical transmitter means comprising, in combination a meter element movable along a predetermined path, an array of contact bars spaced side by side along said path, said element having a contact portion shaped to fit between and in contact with a pair of bars upon abutment of said portion against said array of bars, and means for pressing said element into abutment of said contact portion with the array of bars, said contact portion being yieldably supported for movement thereof in a direction transverse of the path when urged into said abutment by said pressing means and each of said bars being disposed at an acute angle to said last mentioned direction, to promote disposition of the contact portion in engagement between and in contact with a pair of the bars.

3. Electrical transmitter means comprising, in combination, a member movable along a predetermined path, a series of spaced contact bars each extending transversely of the path, said series extending along said path and comprising a multiplicity of said bars each substantially parallel to the others, said member including a contact portion shaped to engage the bars in electrical contact with a pair of them selected from a multiplicity of such pairs in accordance with the position of the member, and said member being normally disposed with said contact portion clear of the bars, and depressor means for moving the member to press the contact portion against the bars, said member including yieldable supporting structure, for effecting sliding movement of said contact portion upon a bar and at an acute angle thereto, under pressure of said depressor means, to promote the aforesaid engagement of said portion in contact with a pair of the bars.

4. Electrical transmitter means comprising, in combination, a member movable along a predetermined path, a series of contact bars transverse of the path at an acute angle thereto, said member including a portion shaped to engage said series in electrical contact with a pair of said bars, said member being normally disposed for clearance between said portion and said bars as the member moves along the path, and intermittently operable means for moving the member against the series of bars, said member including structure mounting the said portion for movement relative to the bars, transverse of the path and at an angle different from the aforesaid acute angle, said intermittently operable means being adapted, on pressing the member against the series of bars, to effect the last-mentioned movement of the member, for promoting electrical contact of the aforesaid portion of the member with a pair of the bars.

5. In an electrical switching device, in combination, a member movable along a predetermined path, and a series of contact bars spaced along said path each at a predetermined acute angle thereto, said member including a resiliently flexible part and a contact portion shaped to fit between and in electrical contact with any pair of said bars, said member being adapted to be urged toward said series of bars to press said contact portion against the latter, and said flexible part being adapted to bend when the contact portion is pressed against a bar, to effect sliding movement of said portion perpendicularly across the path and thereby to promote seating of said portion between and in contact with a pair of the bars.

6. Electrical transmitter means comprising, in combination, a member movable along a predetermined path, a series of spaced contact bars each extending transversely of the path, said member including a contact portion shaped to engage the bars in electrical contact with a pair of them and said member being movable relative to the path so as to be disposed for clearance between said portion and said bars as the member moves along the path, and depressor means for moving the member toward the bars to press the contact portion against the latter, said contact portion being yieldably supported for some sliding movement transverse of the path when pressed against a bar by the depressor means and said contact portion and bars having mutually engageable faces of convex configuration to promote displacement of the contact portion into position of contact with a pair of adjacent bars upon the aforesaid sliding movement of the contact portion.

7. Electrical transmitter means comprising, in combination, a movable member, an instrument for positioning said member along a predetermined path, said instrument normally exerting insufficient force on said member to move it against any substantial retarding pressure on the member, a series of spaced contact bars each extending transversely of the path at a predetermined angle thereto, said member including a contact portion adapted to fit between and in electrical contact with any pair of the bars, and said member being normally disposed for clearance between said portion and said bars as the member moves along the path, and depressor means for moving the member toward the bars to press the contact portion against the latter, said contact portion and bars having mutually engageable faces of convex configuration to facilitate the aforesaid relation of contact, and said contact portion being yieldably supported for sliding movement upon an adjacent bar at an acute angle thereto, when pressed against said bar by the depressor means, to promote disposition of said contact portion in the aforesaid contact relation.

8. Electrical transmitter means comprising, in combination, a movable member, an instrument sensitive to small actuating energy for positioning said member along a predetermined path, said member being mounted in said instrument for at least some freedom of movement along the path in response to application of substantial external force to the member, a series of spaced, round contact bars each extending transversely of the path at an acute angle thereto, said member including a resiliently flexible strip having a sharply convex end edge and extending obliquely toward said series of bars with its side edges aligned in the path, and said member being normally disposed with said end edge clear of the bars, and depressor means for moving the member toward the bars to press the end edge of the strip between and in electrical contact with the nearest pair of bars, said end edge being adapted for sliding movement on the surface of a bar under pressure of said depressor means, perpendicularly across the path by the flexibility of the strip and lengthwise of the path by the aforesaid freedom of movement of the member, to promote seating said end edge between a pair of bars.

9. In an electrical switching device, in combination, selecting contact means movable along a predetermined path, selectable spaced multiple contact means including a surface providing a predetermined arrangement of elevations and depressions alternating along said path, said first and second mentioned means being normally separated but capable of mutual abutment, an intermittently operable device mechanically associable with at least one of said means for pressing one toward the other into said mutual abutment, said first mentioned contact means having a contact-making surface shaped for fitting relation in any one of said depressions in engagement with sides of the elevations adjacent thereto, and one of said contact means being yieldably supported and biased for sliding motion under the abutment-effectuating pressure of the aforesaid device, across the surface of the other contact means in a direction effecting relative displacement of the aforesaid contact-making surface and the path-lengthwise alternation of elevations and depressions in said arrangement, whereby said sliding motion of one contact means cooperates with the arrangement of elevations and depressions to bias the aforesaid contact-making surface to be seated in one of the depressions.

JOHN O. KIRWAN.

REFERENCES CITED

The following references are of record in the file of this patent:

FOREIGN PATENTS

| Number | Country | Date |
|--------|---------|------|
| 322,701 | Italy | Nov. 21, 1934 |
| 324,143 | Italy | Jan. 22, 1935 |